United States Patent [19]

Bücher et al.

[11] Patent Number: 5,210,764
[45] Date of Patent: May 11, 1993

[54] METHOD AND APPARATUS FOR GENERATING LASER RADIATION HAVING MULTIPLE WAVELENGTHS WITH SYNCHRONIZED AND SPATIALLY OVERLAPPING BEAM PROPAGATION

[75] Inventors: Hermann Bücher, Aachen; Werner Fuss; Wolfram E. Schmid, both of Garching, all of Fed. Rep. of Germany

[73] Assignee: Max-Planck-Gesellschaft Zur Förderung Der Wissenschaften E.V., Göttingen, Fed. Rep. of Germany

[21] Appl. No.: 735,635

[22] Filed: Jul. 25, 1991

[30] Foreign Application Priority Data

Jul. 25, 1990 [DE] Fed. Rep. of Germany ....... 4023571

[51] Int. Cl.⁵ ............................................. H01S 3/10
[52] U.S. Cl. ......................................... 372/23; 372/9; 372/10
[58] Field of Search ............................. 372/23, 9, 10

[56] References Cited

U.S. PATENT DOCUMENTS

| | | | |
|---|---|---|---|
| 4,450,563 | 5/1984 | Bepko | 372/23 |
| 4,494,235 | 1/1985 | Guch, Jr. et al. | 372/23 |
| 4,502,144 | 2/1985 | Suhre | 372/23 |
| 4,660,205 | 4/1987 | Harter et al. | 372/23 X |

OTHER PUBLICATIONS

A. V. Evseev et al., "Enhancement of the Selectivity . . ." *Sov. J. Quantum Electron*, (May 1985) 15, No. 5., pp. 689–691.

V. V. Churakov et al., "Two-Color TEA-$CO_2$ Laser . . .," *Applied Physics B*, vol. 42, (1987) pp. 245–249.

A. K. Nath and U. K. Chatterjee, "Theoretical and Experimental Studies of a Multiline . . . ," *IEEE J. Quant. Electronics*, QE-16, No. 11, (Nov. 1980) pp. 1263–1266.

C. D'Ambrosio et al., "New Developments in High-Power . . . ," *SPIE*, vol. 1031, Aug. 1988, pp. 48–55, Seventh Int'l. Symp. on Gas Flow and Chemical Lasers.

*Primary Examiner*—Akm E. Ullah
*Attorney, Agent, or Firm*—Spencer, Frank and Schneider

[57] ABSTRACT

The present invention relates to a method and an apparatus for gerating pulsed laser radiation which contains components at several freely selectable wavelengths. Multi-wavelength emission is synchronized in time, propagates in a precise spatial overlap and has the same beam parameters on a common propagation direction. A preferred embodiment of an apparatus for a such method is a low pressure $CO_2$ laser gas discharge in conjunction with a multi-wavelength resonator including a Q switch.

10 Claims, 1 Drawing Sheet

METHOD AND APPARATUS FOR GENERATING LASER RADIATION HAVING MULTIPLE WAVELENGTHS WITH SYNCHRONIZED AND SPATIALLY OVERLAPPING BEAM PROPAGATION

CROSS REFERENCE TO RELATED APPLICATIONS

The present application claims the rights of priority with respect to application Ser. No. P 40 23 571.8 filed Jul. 25, 1990 in Germany, the subject matter of which is incorporated herein by reference.

BACKGROUND OF THE INVENTION

The present invention relates to a method and apparatus for generating pulsed laser radiation of two or more wavelengths, and in particular to a method and apparatus for generating multiple wavelength pulsed laser radiation in a single volume of a laser medium, each multi-wavelength pulse of radiation being emitted in synchronism and on a common axis so that the different wavelengths of the radiation overlap spatially along the propagation path.

Pulsed lasers with multi-wavelength emission are required, for example, for multi-photon excitation of gases for the purpose of isotope separation, for determining contaminant concentrations by the LIDAR (Light Detection And Ranging) method and for multi-wavelength interferometry. For these methods, it is desireable that the pulses of selected wavelengths propagate in a common beam over long paths, that is, that the pulses precisely overlap each other, are in precise synchronism with each other and have a high pulse peak power.

Methods for wavelength tuned generation of pulsed multi-wavelength laser radiation are described in applicable literature. For example, the following references disclose two different known procedures for wavelength tuned generation of pulsed multi-wavelength laser radiation: "Enhancement of the Selectivity and Yield in Infrared Multiphoton Dissociation of Molecules in Multi-Frequency Infrared Laser Fields," by A. V. Evseev et al., *Sov. J. Quantum Electron.* 15. No. 5, (1985), pages 689–691; "Two-Color TEA-$CO_2$ Laser Oscillation on the Lines of Regular and Hot Bands," by V. V. Churakov et al., *Applied Physics*, Vol. 42, (1987), pages 245–249, and "Theoretical and Experimental Studies of a Multiline TEA-$CO_2$ Laser with Hot $CO_2$ as an Intracavity Absorber," by A. K. Nath and U. K. Chatterjee, *IEEE J. Quant. Electronics* QE-16, No. 11, (1980) pages 1263–1266. In these references, laser radiation is generated with the use of a TEA [transversely excited atmospheric pressure] $CO_2$ laser discharge. The laser medium is under pressure so that those energy exchanges between rotation levels, which play a significant role in the ability of $CO_2$ laser gas to emit radiation at different wavelengths, take place quickly. Consequently, when one laser line begins to oscillate, occupation of all upper laser levels decreases and occupation of all lower levels increases. Hence, inversion is reduced for all laser transitions as soon as one laser line is emitted. Under such conditions, different wavelengths compete for the same inversion and multi-wavelength emission can either no longer be obtained or is unreliable because the radiation under the more favorable oscillation conditions immediately increases at the expense of the weaker radiation and prevents its formation.

In order to overcome this difficulty, Evseev et al. configure their laser resonator so that radiation components at different wavelengths are extracted from spatially separated partial volumes of the excitation volume. However, this approach has grave drawbacks. In particular, in the case of non-adjacent lines, the optical axes of the partial volumes do not lie closely adjacent one another and consequently only a fraction of the entire excitation volume is utilized. Moreover, radiation at widely spaced wavelengths requires an excitation volume with a large discharge cross section and such large cross sections are difficult to realize. Also, although Churakov et al. and Nath and Chatterjee use an excitation volume which lies in a resonator arm which is common to all wavelengths, the resulting emission is limited to precisely two wavelength combinations or limited to wavelength combinations which cannot be selected independently of one another. In both cases the resonator quality is tuned so that the product of amplification and resonator loss is identical (to the extent that no particular wavelength grows at the expense of another) for all emitted wavelengths. But as already mentioned, such multi-wavelength emission is unreliable because competition between the different wavelengths $\lambda_i$ is not avoided.

More recently, Q switched low pressure (pressure of the laser gas $p < 100$ hecto-Pascal [hPa]) continuous wave lasers rather than TEA lasers ($p >> 100$ hPa) have been developed and successfully employed to produce pulsed $CO_2$ laser radiation. For example, Q switched low pressure continuous discharge lasers have been developed in order to examine separation of carbon isotopes as discussed in "New Developments in High-Power CW Discharge MultiKilohertz Repetition Rate $CO_2$ Lasers," by C. D'Ambrosio et al., SPIE, Vol. 1031, GCL-Seventh International Symposium on Gas Flow and Chemical Lasers, Vienna, August, 1988, pages 48–55. Such lasers are intended to be more reliable than TEA lasers since they avoid the susceptible pulsed high voltage discharge required by TEA lasers and revert instead to the mature technology of industrial lasers used in material processing. Evseev et al. show that the use of multi-wavelength laser radiation is advantageous for examining isotope separation of $^{13}C$. Therefore, generation of multi-wavelength radiation with Q switched low pressure lasers also appears to be desirable.

SUMMARY OF THE INVENTION

It is an object of the invention to provide a Q switched laser for producing, in a simple manner, multi-wavelength radiation which meets requirements for spatial overlap and synchronization of the radiation components of different wavelengths.

The above and other objects are accomplished according to the invention by the provision of a method for producing pulsed laser radiation having a plurality of wavelengths on a common beam axis comprising the steps of:

exciting a laser medium in a laser resonator which is tuned simultaneously to different wavelengths, the laser medium having a plurality of laser levels between which energy exchange time constants are long compared to the duration of the laser pulse;

suppressing, during excitation of the laser medium, the oscillation of the laser using a resonator Q switch located in the resonator, until inversion of a plurality of laser levels has bee realized; and switching the resonator Q switch after the suppressing step, to produce the pulsed laser radiation having a plurality of wavelengths on the common beam axis of the laser resonator.

The objects of the invention are further accomplished by the provision of a multi-wavelength laser which includes:

a laser resonator having a common beam axis and including means for simultaneously tuning the laser resonator to a plurality of wavelengths;

a laser medium having a plurality of laser levels between which energy exchange takes a long time compared to the duration of the laser pulse; and at least one Q switch contained in the laser resonator, for suppressing, during excitation of the laser medium, the oscillation of the multi-wavelength laser, until inversion of a plurality of laser levels has been realized, and thereafter for switching the Q of the resonator, to produce pulsed laser radiation having a plurality of wavelengths on the common beam axis.

In the case of a low pressure $CO_2$ laser medium, rotation levels are coupled only slightly due to a low operating pressure and the energy exchange between levels takes place slowly compared to the pulse duration. During operation with only one wavelength, a considerable portion of the excitation energy remains in the rotational levels corresponding to the non-selected rotation lines of the inverted vibrational level. If such a laser is equipped with a resonator which supports several wavelengths, components of the respective wavelengths are observed in the output pulse of the laser and the output energy of the laser pulse is higher than in single-wavelength operation. All limitations with respect to the number and selection of the wavelengths emitted in pulse are then a obviated and discharge volumes which have particularly large discharge cross sections are not required. Therefore, the basic limitations described for the use of TEA lasers are avoided in the generation of multi-wavelength radiation.

According to the present invention, generation of multi-wavelength radiation having the stated characteristics is realized in that a laser medium is employed in which during the pulsed emission at a first wavelength no significant energy exchange between the laser levels occurs. Therefore, population inversion and, concomitantly, build-up conditions for additional wavelengths, are not influenced or only slightly influenced by the oscillation at the first wavelength. This is the case, for example, for a low pressure $CO_2$ laser whose laser medium is a $CO_2$ laser gas discharge at pressures of $p < 100$ hPa.

The prerequisite for multi-wavelength emission is that the corresponding laser levels undergo a population inversion. However, population of the levels is caused less by direct pumping than by distribution of energy from one or a few preferred pumped levels which is preconditioned to be slow. This means that the build-up of the inversion of all laser levels immediately ceases if the inversion of one pair of levels level does not continue to increase as a result of its emission of laser radiation. Thus, it must be ensured that the laser begins to oscillate during pumping only after the desired inversion is reached. A suitable way to obtain this is to use a resonator Q switch which keeps the resonator quality so low during the pumping phase that the laser is unable to begin oscillating. The use of the Q switch of the resonator in the above manner is therefore a further characteristic of the method. The production of multi-wavelength radiation was demonstrated by applying the principles discussed above to a correspondingly modified version of the laser disclosed in D'Ambrosio et al. It should be obvious that the method is not limited to the use of $CO_2$ laser gas with low-pressure discharge; rather, any laser media having a weak or low exchange rate for the energy between the laser levels is suitable.

A further shortening of the laser pulses and thus an increase of the peak power is of great advantage for many non-linear processes, such as, for example, photochemistry, isotope separation or Raman shifts. With pulsed lasers, this effect is usually obtained by coupling the phases of longitudinal modes of the resonator [mode locking], resulting in a pulse chain of numerous pulses for a resonator with a conventional length. The interval between two successive pulses corresponds to the resonator round-trip time. The duration of the pulse chain essentially corresponds to the pulse duration without mode locking. The length of the resonator can be extended to such a degree that the pulse chain is composed only of one or a few pulses. In this way, the energy is concentrated in few pulses or a single pulse or in a main pulse with only insignificant precursors and followers. The peak power is thus increased even further. However, the method furnishes reproducible pulses only if mode locking and Q switching are synchronized in time, since only then the temporal position of the desired main pulse can be controlled and thus the occurrence of several comparatively large pulses can be prevented.

The invention will now be described in greater detail with reference to embodiments that are illustrated in the figures.

DETAILED DESCRIPTION OF PREFERRED EMBODIMENTS

Figure 1:
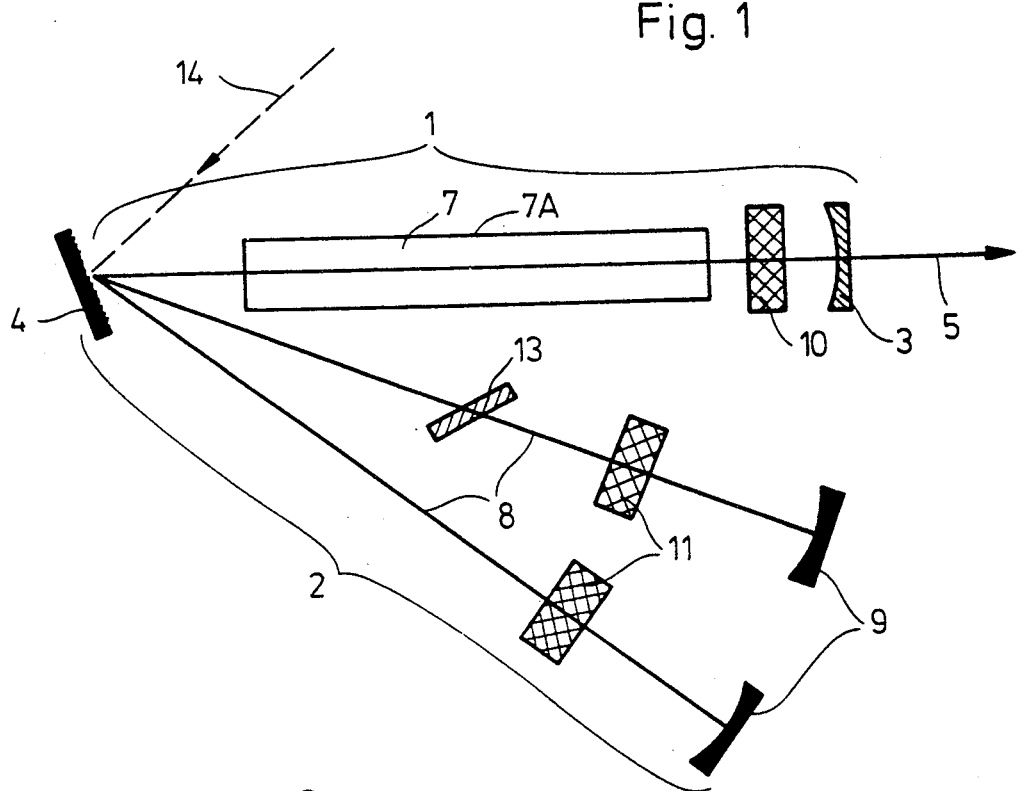
FIG. 1 is a schematic representation of a first embodiment of the invention.

FIG. 1 is a schematic representation of a first embodiment of the invention. A resonator with multi-wavelength tuning is composed of an arm 1 that is common to all wavelengths and an arm 2 comprised of several wavelength determining arms or wavelength selecting partial light patterns 8. Arm 1 is composed of a partially transparent outcoupling mirror 3 through which a multi-wavelength beam 5 exits from the resonator. Arm 1 also has a diffraction grating 4 which is oriented so that radiation coming from a laser medium 7 within a chamber 7A and impinging on the diffraction grating is fanned out into individual wavelength determining arms 8 (partial beams of radiation at different wavelengths $\lambda_i$). Resonator end mirrors 9 are selected and set up so that radiation at a particular wavelength $\lambda_i$ is reflected precisely back onto itself. Laser medium 7 can be, for example, a low pressure discharge medium of a commercially available material processing laser.

The desired wavelengths are selected according to the alignment of mirrors 9. A Q switch 10 can be disposed in arm 1 or, alternatively, synchronized Q switches 11 can be employed in individual wavelength determining arms 8. Rotating discs equipped with openings called chopping vanes are suitable as Q switches 10 and 11. Positioning synchronized Q switches 11 in individual wavelength determining arms 8 can be used, if a controlled delay between the pulses of different wavelengths is desired.

Locking (coupling) of the longitudinal modes can be achieved either by phase modulation or by loss modulation inside the laser resonator, or by injecting short pulses or chains of short pulses from an external source into the resonator. The injected light may consist of a single wavelength or of a plurality of different wavelengths arriving simultaneously or with controlled delays. Synchronization with Q switching is required in either case. The injection of the auxiliary radiation can be done for example at the grating 4 via its zeroth diffraction order 14.

Locking of the longitudinal modes of the resonator in FIG. 1 can result in a pulse chain of numerous pulses of multi-wavelength beam 5 if the resonator has a conventional length, because the interval between two successive pulses corresponds to the resonator round-trip time. Here the resonator length corresponds to the length of arm 1 added to the length of arm 2. The duration of the pulse chain produced by mode locking essentially corresponds to the duration of the pulse without mode locking. Hence, the length of the resonator can be extended to such a degree that the pulse chain produced by mode locking is composed of only one or a few pulses. Consequently the energy can be concentrated in few pulses or a single pulse or in a main pulse with only insignificant precursors and followers and the peak power output for the single pulses of the multi-wavelength radiation 5 is thus increased even further. However the method produces reproducible pulse trains only if the mode locking and the Q switching are synchronized in time, since only then the temporal position of the desired main pulse can be controlled and thus the occurrence of several pulses of comparable power can be prevented.

Figure 2:
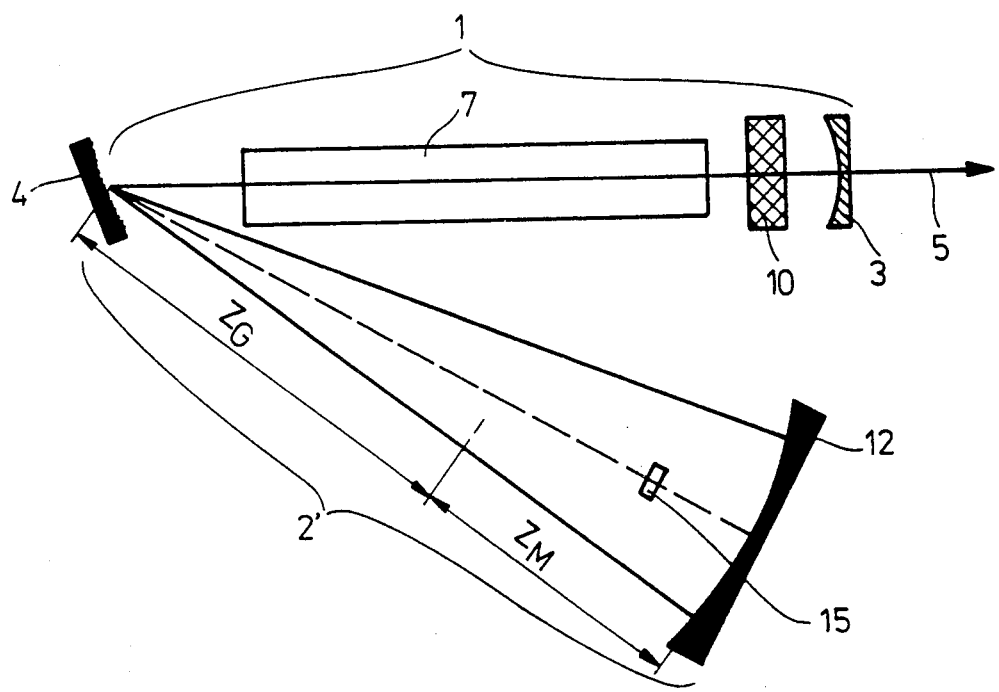
FIG. 2 shows another embodiment of the invention which requires only one end mirror 12 for all wavelengths $\lambda_i$.

FIG. 2 shows a special embodiment in which a second resonator arm 2' has only one end mirror 12 common to all wavelengths $\lambda_i$. The prerequisites for end mirror 12 to meet the feedback conditions for all wavelengths are that:

1. the center of the curvature of mirror 12 must lie on diffraction grating 4; and
2. the curvature radius of end mirror 12 must coincide with the radius of the wavefront at the location of the mirror.

If $Z_G$ and $Z_M$ are the distances between the waist of the resonator mode and the grating 4 and mirror 12, respectively (See FIG. 2) then both these conditions are met if $Z_G$ and $Z_M$ meet the requirement of $Z_G \cdot Z_M = L_R^2$. The length $L_R$ is the Rayleigh length, a constant characteristic to the fundamental transverse mode of the resonator. The embodiment of FIG. 2 is preferred if the desired wavelengths are adjacent to one another or if more than one wavelengths is desired. Undesired wavelengths are suppressed by blocking a portion of the corresponding resonator arm by a beam stop 15, such a beam stop is made of material opaque to the wavelength to be blocked.

The possibly required matching of relative time delays and of relative intensities of the pulses of selected wavelengths can be effected in both embodiments by a controlled introduction of losses using loss element 13 as shown in FIG. 1. Loss element 13 can be, for example, partially transparent mirrors or apertures, and can be placed in any one of wavelenth determining arms 2 and 2' of the corresponding wavelength. In the embodiment of FIG. 1, the reflectivity of the respective end mirrors 9 may also be utilized to introduce losses. Finally, auxiliary radiation of a single wavelength or of a plurality of wavelengths provided by low power CW or pulsed lasers can be injected via the zeroth diffraction order 14 of the grating 4. By such auxiliary radiation, one can shorten the pulse length or induce mode locking or one can influence the relative energy and delay of the pulses at the different wavelengths. Energy and time of the injected light influences energy and time of the output pulse 5 at the same wavelength.

Multi-wavelength radiation with the desired properties has been demonstrated successfully by the present apparatus and method. It was found that the output energy of the arrangement according to the invention increases as a result of multi-wavelength operation, since population inversion is achieved and laser radiation is generated at multiple wavelengths instead of a single wavelength.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A method for producing pulsed laser radiation having a plurality of wavelengths on a common beam axis comprising the steps of:
    exciting a laser medium in a laser resonator which is tuned simultaneously to different wavelengths, the laser medium having a plurality of laser levels between which energy exchange time constants are long compared to the duration of pulsed laser emission;
    suppressing, during excitation of the laser medium, the oscillation of the laser using a resonator Q switch located in the resonator, until inversion of a plurality of laser levels has been realized; and
    switching the resonator Q switch after said suppression step to produce simultaneously the pulsed laser radiation having a plurality of wavelengths on a common beam axis of the laser resonator.

2. The method as defined by claim 1, wherein the laser resonator has a first arm common to all wavelengths and a second arm including a plurality of wavelength selecting partial light paths coupled with the first arm for tuning the resonator to a plurality of different wavelengths and said method further comprises locating a Q switch in the common arm or in each partial light path.

3. The method as defined in claim 2, further including the step of disposing a loss element in at least one of the partial light paths to independently control the energy and the delay of the pulses of the different wavelengths associated with the different light paths.

4. The method as defined in claim 1, further including the step of injecting auxiliary radiation into the laser medium thereby independently controlling the energy, the pulse length and the delay of pulses of different wavelengths.

5. The method as defined in claim 1, further including the step of independently Q switching the different wavelengths, thereby independently controlling the delay of radiation pulses at the different wavelengths.

6. The method as defined in claim 2, further including the step of:

mode locking the pulsed laser radiation having a plurality of wavelengths in order to produce a pulse train of radiation having a plurality of wavelengths and having shortened pulses relative to the pulsed laser radiation without mode locking thereby increasing pulse peak power by concentrating laser energy in the shortened pulses.

7. The method as defined in claim 2, further including the steps of:

mode locking using a resonator length with a round-trip time comparable to the pulse length without mode locking, so that the resulting pulse chain consists of only one or a few pulses and in which mode locking and Q switching is synchronized to control the exact time of the peak of the maximum pulse.

8. A multi-wavelength laser comprising:

a laser resonator having a common beam axis and including means for simultaneously tuning the laser resonator to a plurality of wavelengths;

a laser medium in said laser resonator having a plurality of laser levels between which energy exchange time constants are long compared to the duration of the pulsed laser emission; and at least one Q switch contained in said laser resonator for suppressing, during excitation of the laser medium, the oscillation of the multi-wavelength laser, until inversion of a plurality of laser levels has been realized, and thereafter for switching the Q of the resonator to produce simultaneously pulsed laser radiation having a plurality of wavelengths on the common beam axis.

9. The multi-wavelength laser as claimed in claim 8, wherein said laser medium is a low pressure $CO_2$ laser gas discharge medium.

10. The multi-wavelength laser as claimed in claim 8, wherein said laser radiation comprises:

a first arm including a grating; and a second arm including a single concave mirror having a curvature approximately equal to the curvature of a wavefront of radiation at the location of the mirror, said concave mirror arranged so that its center of curvature lies on said grating surface.

* * * * *